Sept. 28, 1948.　　　　R. MARPLE　　　2,450,052
LOCKING SYSTEM FOR VEHICLE DOORS
Filed Oct. 11, 1941　　　　　　　　6 Sheets-Sheet 1
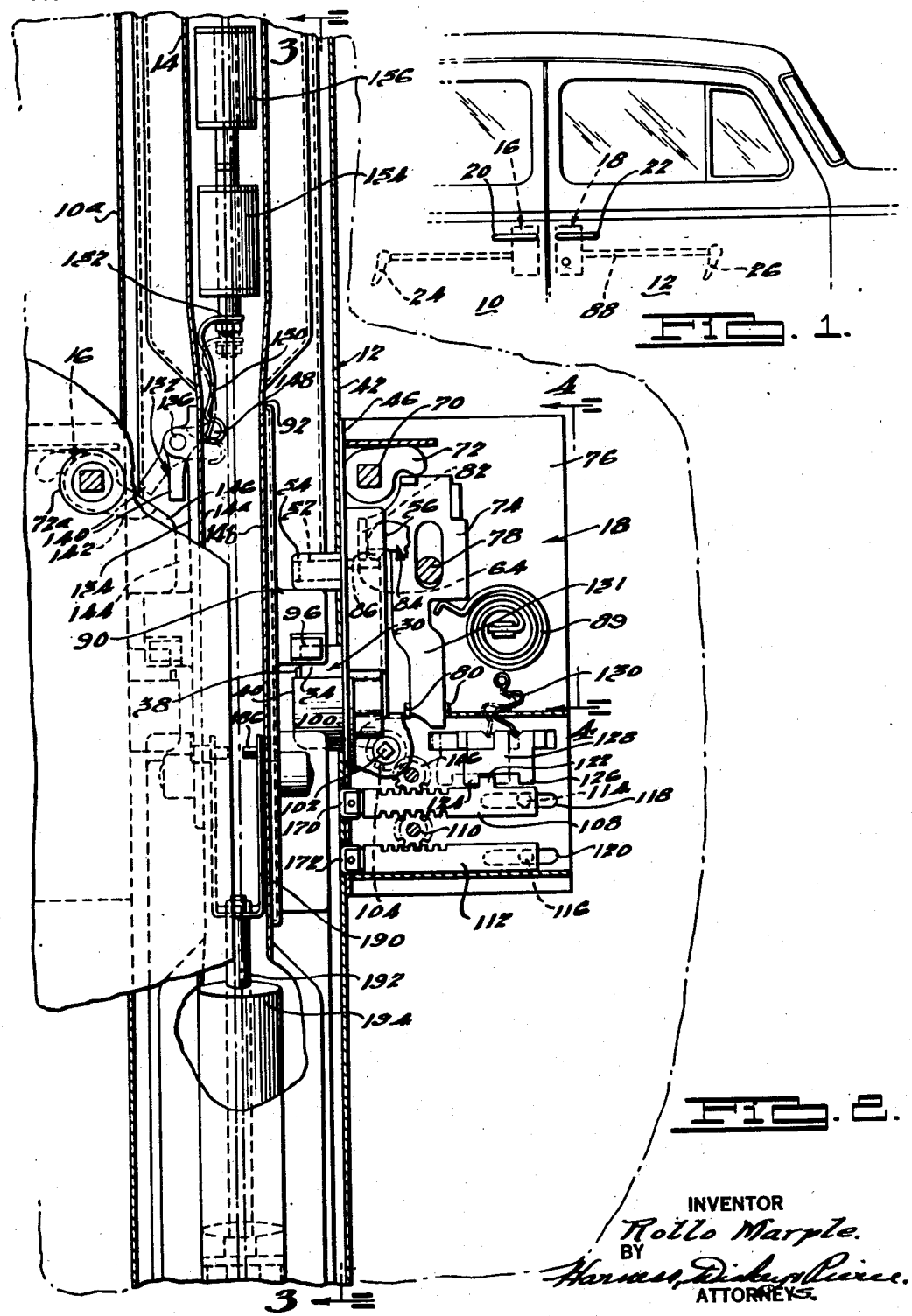
INVENTOR
Rollo Marple.
BY
ATTORNEYS.

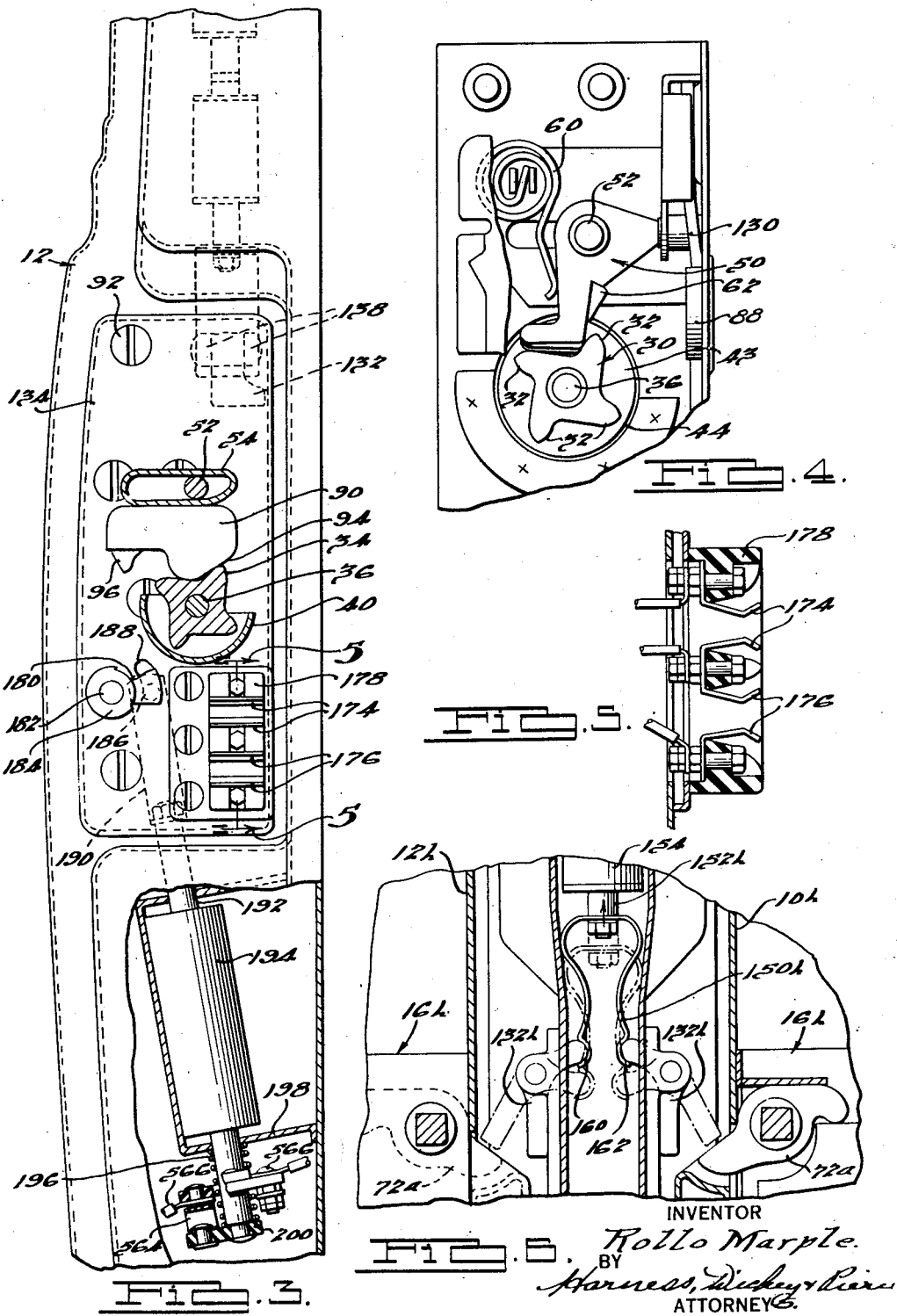

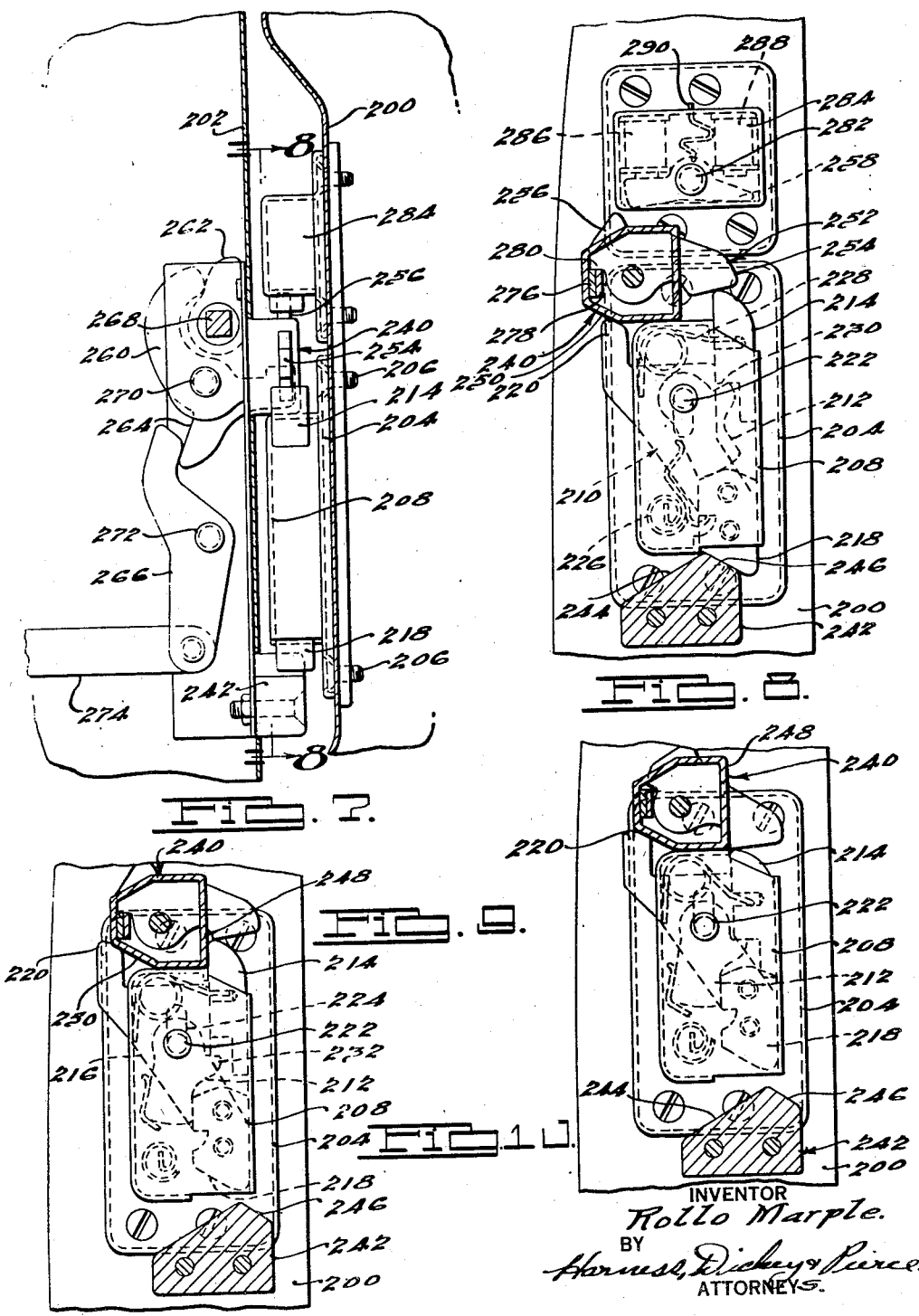

Sept. 28, 1948.  R. MARPLE  2,450,052
LOCKING SYSTEM FOR VEHICLE DOORS
Filed Oct. 11, 1941  6 Sheets-Sheet 4
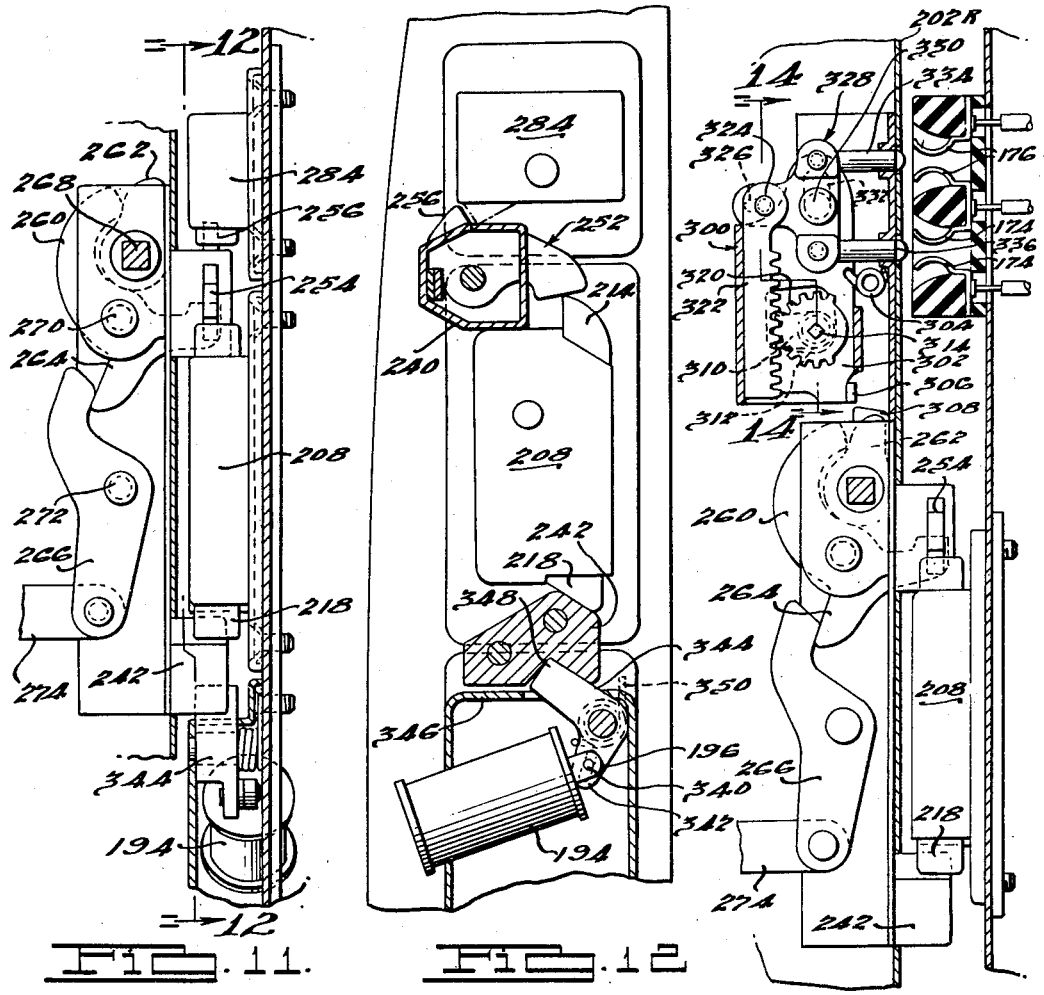
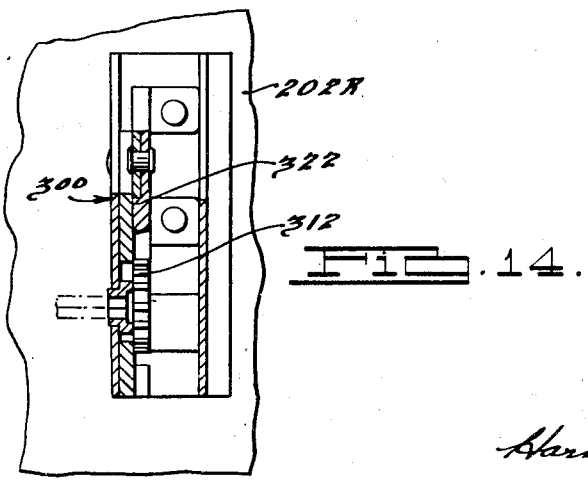
INVENTOR
Rollo Marple.
BY
Harness, Dickey & Pierce
ATTORNEYS.

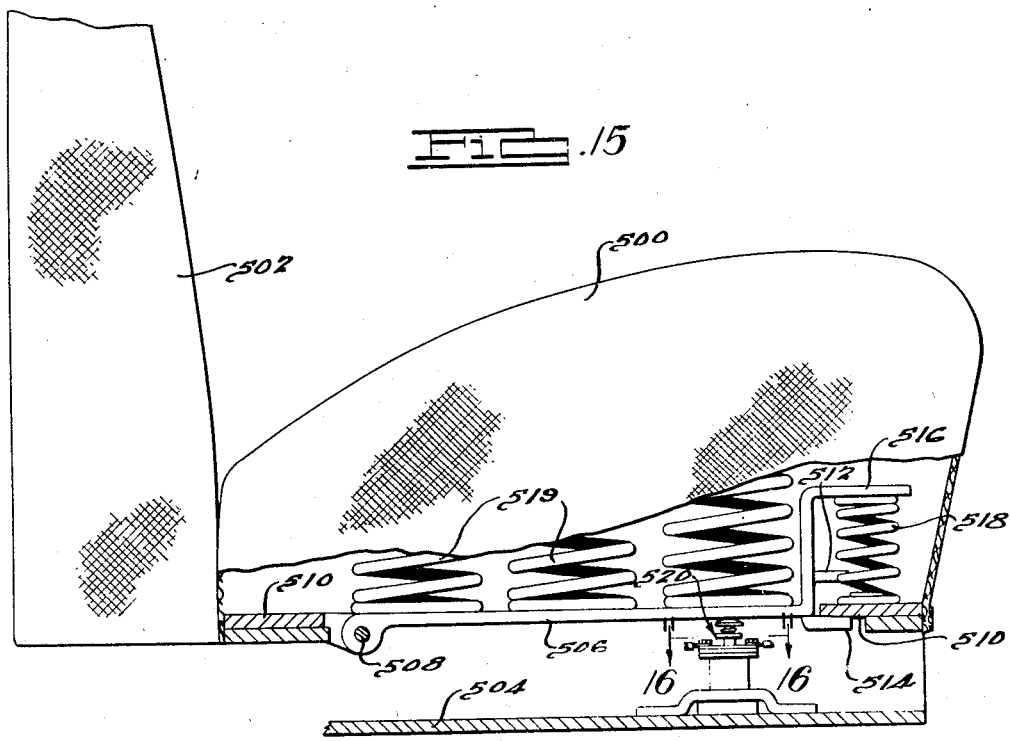
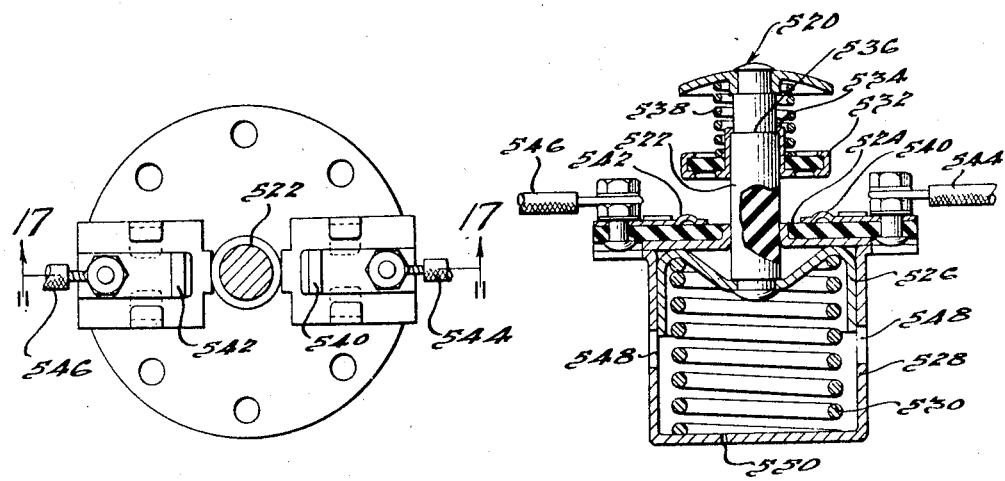

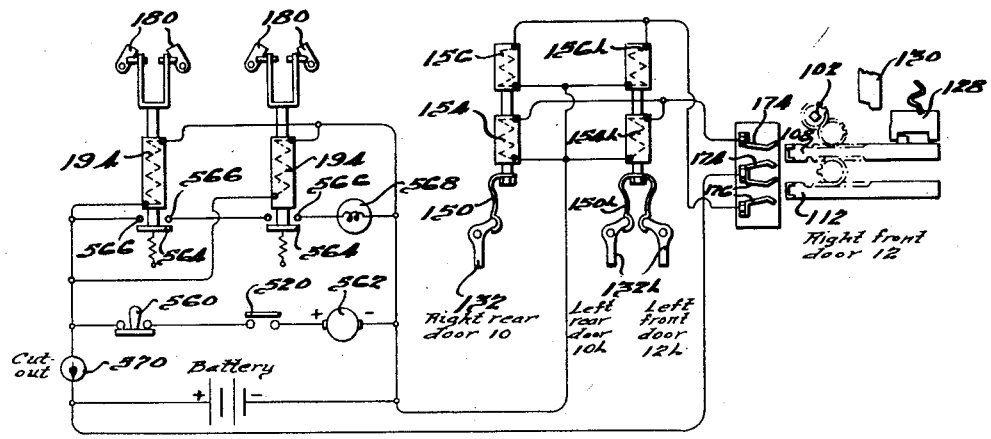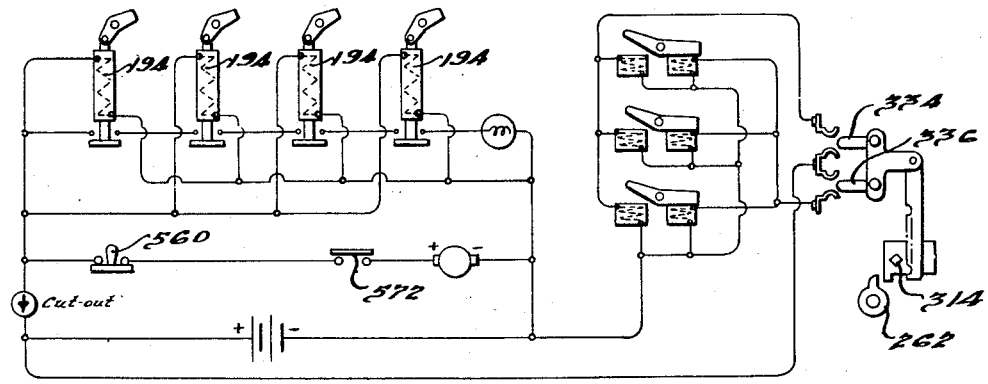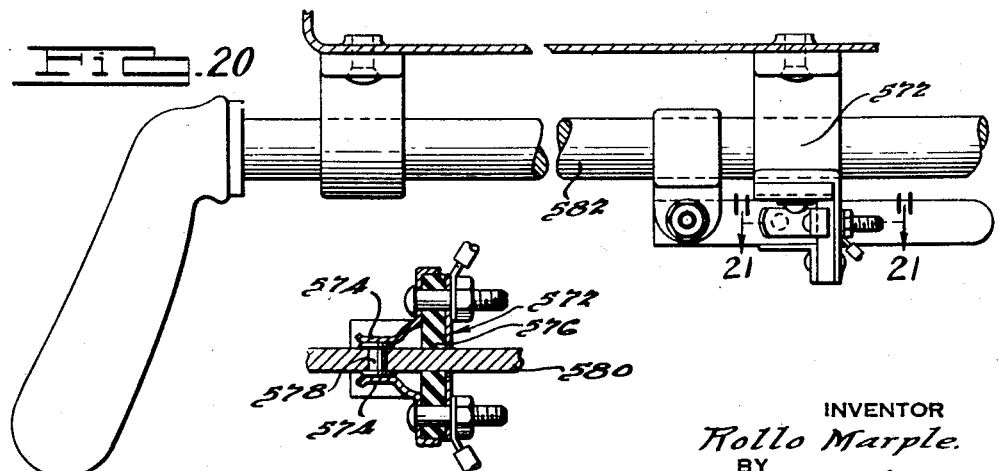

Patented Sept. 28, 1948

2,450,052

UNITED STATES PATENT OFFICE 2,450,052

LOCKING SYSTEM FOR VEHICLE DOORS

Rollo Marple, Jackson, Mich., assignor to Hancock Manufacturing Company, Jackson, Mich., a corporation of Michigan Application October 11, 1941, Serial No. 414,627

7 Claims. (Cl. 70—264)

The present invention relates to vehicle latching systems, and in particular is directed to improved systems for coincidentally controlling the locked or unlocked condition of a plurality of vehicle doors and to the provision of improved latch or lock structures for use in such systems.

The principal objects of the present invention are to provide systems of the above generally indicated character, which are simple in construction, economical of manufacture and installation, and which are reliable and efficient in operation. Further objects of the invention are to provide such systems embodying a plurality of locking elements, individual to the respective doors, which are responsive to one or more operators positioned within the vehicle and embodying an additional series of locking elements, individual to at least certain of the doors, which may be coincidentally controlled by means of an operator, such as a key, located externally of the vehicle; to provide such systems in which in certain embodiments the locking elements directly act between the door and the associated pillar structure to prevent an opening movement of the door, and which in certain other embodiments operate to render one or both of the handles associated with the corresponding door latch ineffective to release such latch; to provide, for use in systems of the above generally indicated type, as well as for other purposes, improved latch structures; to provide, for use in systems of the above type, as well as for other purposes, improved constructions of operating means for the individual locking or latching elements; and to generally improve the construction and arrangement of vehicle latching or locking systems.

With the above, as well as other objects in view, which appear in the following description and in the appended claims, preferred but illustrative embodiments of the invention are shown in the accompanying drawings, throughout the several views of which corresponding reference characters are used to designate corresponding parts and in which:

Figure 1 is an exterior view in elevation of front and rear righthand doors of a vehicle equipped with one embodiment of the invention;

Fig. 2 is a view in vertical section, taken through the pillar which separates the doors of Fig. 1 in a plane generally parallel to the plane of the doors;

Fig. 3 is a view in section, taken along the line 3—3 of Fig. 2;

Fig. 4 is a fragmentary view, taken along the line 4—4 of Fig. 2;

Fig. 5 is a detail view in vertical section, taken along the line 5—5 of Fig. 3;

Fig. 6 is a fragmentary view corresponding in certain hereinafter mentioned respects to Fig. 2, but showing the interiorly controlled locking elements associated with the front and rear doors at the lefthand side of the vehicle;

Fig. 7 is a view in vertical section, taken in a plane generally parallel to the plane of the associated door of a modification of the invention;

Fig. 8 is a view in section, taken along the line 8—8 of Fig. 7, the parts being shown in the fully closed position of the door;

Fig. 9 is a view corresponding to Fig. 8, but showing the parts in the partially closed or safety position;

Fig. 10 is a view corresponding to Figs. 8 and 9, but showing the parts in a released or open position of the door;

Fig. 11 is a view in vertical section, corresponding generally to Fig. 7, but illustrating a further modification of the invention;

Fig. 12 is a view taken along the line 12—12 of Fig. 11;

Fig. 13 is a view corresponding generally to Fig. 11, but showing the application thereto of mechanically controlled locking means;

Fig. 14 is a view in detail, taken along the line 14—14 of Fig. 13;

Fig. 15 is an enlarged detail view of a preferred seat actuated switch which may be used in the practice of the invention;

Fig. 16 is a view in horizontal section, taken along the line 16—16 of Fig. 15,

Fig. 17 is a view in vertical section, taken along the line 17—17 of Fig. 16,

Figs. 18 and 19 are diagrammatic views of electrical control systems embodying the invention;

Fig. 20 is a view in elevation of a brake lever controlled switch, which may be used in the practice of the invention; and Fig. 21 is a sectional view, taken along the line 21—21 of Fig. 20.

It will be appreciated from a complete understanding of the present invention that the improvements thereof may be embodied in widely differing latching or locking systems and may take widely differing structural forms. The particular structures and arrangements herein illustrated represent embodiments of the invention which are now preferred, but the disclosure herein of such structures and arrangements is to be taken in an illustrative and not in a limiting sense.

Referring first to the embodiment of Figs. 1 through 6, the usual rear and front doors 10 and 12 at the righthand side of the illustrated vehicle are hinged in any suitable way (not shown) along their rear and front edges. As will also be understood, the vehicle body structure comprises a vertically extending pillar 14, which lies between the adjacent rails of the doors 10 and 12, when the latter are in closed position. The doors 10 and 12 are provided with latches 16 and 18, which are disposed to respond to the usual associated outside handles 20 and 22, and the usual associated inside handles 24 and 26.

Except in the hereinafter noted respects, the latches 16 and 18 may and preferably do embody the construction disclosed in applicant's Patent No. 2,195,179, granted March 26, 1940, and assigned to the assignee hereof. Stated generally, the latch 18 comprises a rotatable bolt 30, having an inner or cam engaging series of teeth 32 and an outer series of keeper engaging teeth 34, it being understood that the number and angular spacing of the teeth 34 corresponds to the number and angular spacing of the teeth 32, all as more particularly described in the aforesaid patent. The bolt 30 is rotatably carried upon pin 36, the outer end whereof is journalled in a bearing portion 38 provided therefor in a housing member 40, which projects outwardly through the rail 42 of the door 12 and encloses the lower portion of the bolt 30. The inner teeth 32 and outer teeth 34 of the bolt 30 are separated by a fin 43, which is rotatable within registering circular openings 44 provided therefor in the flange 46 of the associated case plate and in the rail of the door.

The inner bolt teeth 32 cooperate with a series of progressively dimensioned holding cams 50, which are pivotally supported upon a pin 52. One end of the pin 52 is supported by an abutment 54, which is carried by the case plate flange 46 and projects outwardly through the rail 42 of the door. The other end of the pin 52 is supported in a deck 56, which is carried by the flange 46 in inwardly spaced relation thereto. The deck 56 also forms a support for the inner end of the bolt pin 36. The cams 50 are provided with biasing springs, such as 60, individual thereto and the shortest one of these cams is provided with a turned foot 62 which overlies the backs of the other cams and is also provided with a laterally extending foot 64 for cooperation with the hereinafter mentioned retracting members associated with the inside and outside handles. With this relation, a retracting movement of the shortest cam causes corresponding retracting movements of the longer cams and upon release of the shortest cam, the springs individual thereto are enabled to urge the cams to the operating positions shown in Fig. 4.

The outside handle 22, associated with the righthand front door 12, is provided with a usual squared spindle 70, which, adjacent its inner end, is provided with a usual rollback 72. The nose of the rollback 72 bears upon the upper end of a retracting slide 74. Slide 74 is slidably guided, adjacent the base 76 of the case plate, by means of a pivot pin 78 and by means of the guide surface 80 associated with the lower end thereof. The slide 74 is provided with a laterally offset foot 82, which lies above and in operating relation to the previously mentioned cam foot 64, it being understood that a downward movement of the slide 74, as influenced by the rollback 72, causes the cams 50 to swing in a clockwise direction, as viewed in Fig. 4, thereby enabling the bolt 30 to freely rotate, which latter action enables the door to be opened, as will be understood.

The pin 78 forms a pivotal support for a lever 84, having a nose 86 which also lies above and in operating relation to the cam foot 64. The lever 84 is pivotally connected to a usual link 88, which may and preferably does extend to the corresponding inside handle 26. It will be understood that the handle 26 may be provided with spring mechanism which biases it and the lever 84 to the positions shown in Figs. 1 and 2. By swinging the handle 26, however, so as to rock the lever 84 in a counterclockwise direction, the cams 50 are retracted in the previously described manner, thereby enabling the door to be opened. The just-mentioned spring mechanism returns the lever 84 and handle 26 to the normal positions upon release of the handle 26, and a corresponding return movement is imparted to the slide 74 by means of a spring 89 upon release of the outside handle 22.

The outer series of bolt teeth 34 cooperate with a keeper 90 in the manner described in the aforesaid patent. More particularly, the keeper 90 is secured to the jamb face 92 of the previously mentioned pillar 14 and in the closed position of the door is received between the bolt 30 and the previously mentioned abutment 54. In this positioning of the parts, the camming force on the bolt 30 of the cams 50, causes the bolt 30 to react against the keeper 90 and wedge the same against the abutment 54. The keeper 90 is provided with a bolt engaging face 94, which functions when the parts are in the fully closed position of the door, and is also provided with a retractable spring-pressed safety catch 96, which enables the bolt to move therepast during a closing movement of the door, but prevents movement of the door therepast during an opening movement, unless the bolt is released for free rotation, as mentioned above.

To the extent thus far described, the latches 16 and 18, associated with the front and rear doors 10 and 12, respectively, may be and preferably are duplicates of each other, and this relation is indicated by the use of corresponding reference characters applied to certain of the parts of latch 16 in Fig. 2.

In accordance with the embodiment now being described, it is proposed to provide each door with locking mechanism which is automatically controlled, as hereinafter described, in accordance with an operating condition of the vehicle, and to additionally provide locking mechanism for each door, which may be controlled from a point, such as a key station, on the outside of the vehicle. The corresponding locking mechanisms for all of the doors are adapted to be controlled coincidentally. For convenience of description, the elements which form the locking system which responds to an operating condition of the vehicle are hereinafter referred to as the inside locking elements or the inside locking system, as the case may be, and those which respond to the external key station are hereinafter referred to as the outside locking elements or outside locking system, as the case may be.

With more specific reference to the outside locking system, one of the doors, in this case the righthand front door, is provided with a usual lock cylinder mechanism 100, which may be turned in the usual way by inserting a key thereinto from the outside of the door. In accordance with usual practice, the arrangement is such that to lock the door, the key is inserted into the cylinder, turned in one direction through an angle of approximately 90° and thereafter returned to its original position and withdrawn. To unlock the door, the key is inserted, turned through an angle of approximately 90° in the opposite direction, returned to its original position and withdrawn. The spindle associated with the just-mentioned lock cylinder is designated at 102, and carries a pinion 104, which, through an idler gear 106, drives a rack bar 108. The rack bar 108, in turn, through an idler pinion 110, drives a second rack bar 112. The two rack bars are suitably supported upon the case plate 76 for sliding movement to the right and to the left, as viewed in Fig. 2. Normally, both rack bars 108 and 112 occupy the illustrated intermediate positions and both thereof may be moved to the right and to the left of such intermediate positions. The limits of movement of the bars 108 and 112 are determined by pins 114 and 116 carried thereby, which ride in elongated slots 118 and 120 provided therefor in the base of the case plate.

The upper rack bar 108 is provided with an upstanding projection 122, which is received between the depending legs 124 and 126 on a locking slide 128. The locking slide 128 is suitably guided upon the case plate and is normally held in its righthand limit position by means of a suitable over-center spring 130, in which position the lefthand leg 124 is abutted by the projection 122. In this normal position, the slide 128 lies below and to one side of the path of movement of a tailpiece 131 formed on the retracting slide 74, and consequently does not interfere with the normal up and down movements thereof. If, however, the key spindle 102 is rocked in a locking direction, that is, in a counterclockwise direction, as viewed in Fig. 2, bar 108 is moved to the left, and this movement is imparted to the locking slide 128, bringing this member to a point below and in blocking relation to the slide 74. The return movement of the spindle 102 restores the bar 108 to its normal position, which movement is, however, not communicated to the locking slide 128 because of the spacing between the legs 124 and 126 thereof. If the locking spindle 102 is rocked in an unlocking direction, that is, in a clockwise direction, bar 108 is caused to move to the right from its center position, and during the course of this movement, it restores the locking slide 128 to its righthand or unlocked position. The spring 130 functions, as will be understood, to hold the slide 128 in either of its just-mentioned two positions.

The outside locking means for the rear door 10 at the righthand side of the vehicle comprises a bell crank lever 132, which is pivotally mounted upon a mounting plate 134, which is secured to the previously-mentioned jamb face 92 of the pillar 14, by means of a pin 136. The opposite ends of the pin 136 are supported in bearing members 138, which are either formed integrally with or are suitably secured to the mounting plate 134, and these bearing members 138 receive the bell crank lever 132 between them. In its unlocked position, the arm 140 of the bell crank lever 132 hangs substantially vertically, and lies immediately adjacent the base of the mounting plate 134. The lever 132 may, however, be swung in a clockwise direction from the unlocked position, shown in full lines, to the locked position, shown in dotted lines in Fig. 2. In the latter position, the arm 140 of bell crank 132 lies above and in blocking relation to a projection or tailpiece 142 provided on the rollback 72a, associated with door 10. The tailpiece 142 projects into a housing or shell 144, which is carried by the flange of the latch 16 and projects outwardly through the rail 10a of door 10. The under surface of the shell 144 cooperates with the keeper 90, associated with door 10, in the manner previously described in connection with the keeper 90 and abutment 54, associated with door 12. The upper surface 146 of the shell 144 is angled, as shown, and this enlarged upper portion acts to normally conceal the tailpiece 142. The angled surface 146 is, however, provided with a slot through which the tailpiece can move when the rollback 72a is swung in a counterclockwise or door opening direction. Such movement of the tailpiece, and consequently of the rollback 72a is, however, prevented when the bell crank lever 132 is swung into the dotted line position shown in Fig. 2.

The pillar 14 is of generally channel shape throughout its length, as will be understood, and is narrowed in the regions of the latches 16 and 18. The reference numerals 14a and 14b are applied to the flanges of the channel-shaped pillar in the narrowed region thereof, and it will be understood that the flange 14a is provided with a suitable opening through which the arm 148 of the locking lever 132 may project.

The end 148 of the bell crank locking lever 132 is connected, by means of a spring 150, to the armature 152 of a solenoid structure comprising a locking electromagnet 154 and an unlocking electromagnet 156, it being understood that upon energization of the electromagnet 154, armature 152 is caused to move downwardly and swing the locking lever from the full line position to the dotted locking position. If the electromagnet 156 is energized, on the other hand, the armature 152 is drawn upwardly and restores the locking lever 132 to the unlocked position. By virtue of the arcuate path in which the end 148 of the lever 132 moves, the spring 150 is enabled to yieldingly bias the lever 132 and armature 152 to either the locked or the unlocked position.

Referring particularly to Fig. 6, the front door 12L at the lefthand side of the vehicle and the corresponding rear door 10L are provided with latches 16L, which correspond in all respects to the latch 16, associated with the rear door 10 at the righthand side of the vehicle, which relations are indicated by the use of the subscript "L" applied to the corresponding reference characters. In addition, the doors 10L and 12L are provided with bell crank locking levers 132L individual thereto, the mounting and arrangement whereof are the same as for the locking lever 132. In this instance, the armature 152L, associated with the operating electromagnets, is provided with a U-shaped spring 150L, the respectively opposite ends 160 and 162 whereof are individual to the levers 132L.

The energization and de-energization of the electromagnets 154 and 156, associated with the rear righthand door 10 and with the front and rear lefthand doors 10L and 12L, is controlled by the previously mentioned rack bars 108 and 112, which are movably responsive to the key spindle 102. More particularly, the lefthand end of the bar 108 is disposed to project through registering openings provided therefor in the flange of the case plate 76 and in the rail 42 of the door 12, and is provided with a contact surface 170 formed of suitable conducting material, which contact surface is insulated from the body of the bar, The bar 112 is similarly arranged and is provided with a contact surface 172. The pillar 14 is provided with two pairs of stationary contacts 174 and 176, respectively, which are received in a cup-like depression formed in a supporting member 178 of insulating material. When the key spindle 102 is turned in a locking direction, the bar 108 moves to the left and the contact 170 thereon is projected into the space between and completes an electrical circuit through the contacts 174. The return movement of the key spindle 102, so as to enable withdrawal of the key, on the other hand, withdraws the bar 108 to the retracted position shown in Fig. 2, thereby interrupting the just-mentioned connection. Similarly, when the key spindle 102 is turned in an unlocking direction, the bar 112 is projected to the left and the contact 172 thereon engages and completes a circuit through the stationary contacts 176. The latter circuit is interrupted by the return movement of the spindle 102, which restores the bar 112 to the retracted position. As described in connection with Fig. 25, the locking electromagnets 154, associated with all of the doors except the door 12, are connected to be energized when the circuit is completed through the fixed contacts 174, and the unlocking electromagnets 156, associated with such doors, are connected to be energized when a circuit is completed through the contacts 176.

The inside locking mechanism for the doors 10 and 12 is shown in Figs. 2 and 3, and preferably is duplicated for the doors 10L and 12L at the left-hand side of the vehicle. This locking mechanism for the door 12 comprises a pivoted locking lever or arm 180, which is carried by a pin 182. The ends of the pin are supported, respectively, in the previously mentioned mounting plate 134 and in a small hoodlike stamping 184, which encloses the lower end of the locking arm 180. The locking arm 180 is provided with an operating pin 186, which projects from the body thereof, through a slot 188 in the mounting plate 134 and in the jamb face 92 of the pillar 14, into the body of the pillar 14. At its inner reduced end, the operating pin 186 is connected to a U-shaped stamping 190, which, in turn, is connected to the armature 192 associated with an electromagnet 194, which electromagnet is also mounted within the pillar 14.

The armature 192 is normally urged to the illustrated lower or unlocked position by means of a compression spring 196, which surrounds the lower end thereof and is seated between the supporting housing 198 for the electromagnet and a contact support 200 carried by the armature 192. It will be understood, however, that by energizing the electromagnet 194, the armature 192 is drawn upwardly in opposition to the force of spring 196, and, through the pin 186, rocks the locking arm 180 into a position in which it lies in the path of and in blocking relation to the housing 40, which encloses the bolt 30. The arm 180 and the housing 40 are, therefore, effective to cooperate with each other to prevent an opening movement of the door. Upon de-energization of the electromagnet 194, however, the spring 196 is effective to lower the armature 192 and restore the locking arm 180 to the unlocked position in which it does not interfere with the opening movement of the door. The door 10 is provided with a similar locking arm, and as previously mentioned, the doors 10L and 12L at the lefthand side of the vehicle are also similarly provided.

Considering the operation of the embodiment now being described, it will be appreciated that the doors 10 and 12 are shown in the fully closed positions, and the doors 10L and 12L may also be regarded as fully closed. The inside locking elements comprising the locking arms 180 are shown in their unlocked position, and the same is true of the outside locking elements comprising the slide 128 associated with the door 10 and the locking levers 132 and 132L, associated with the other doors. With the parts in these positions, any of the doors can freely be opened in the usual way by operating either the inside or the outside handle. To open the door 12, for example, the outside rollback 72 may be rocked clockwise, thereby carrying the retracting slide 74 downwardly, which action, as previously described, rocks the cams 50 out of cooperative relation to the bolt 30, and enables the latter to freely rotate across the keeper 80 much in the manner that a gear rolls across a rack. The same action can be accomplished by swinging the inside lever 84, associated with door 12, in a counterclockwise direction, and it will be understood that either the inside or the outside handle, as the case may be, may be released as soon as the door is open, thereby enabling the biasing spring 60, associated with the holding cams 50, effective to restore these cams to the operative positions shown in Fig. 4. A closing movement of the door enables the bolt 30 to move the retractable safety catch 96 out of the way, and continued such closing movement enables the keeper 90 to rock the bolt 30 in a counterclockwise direction, as viewed in Figs. 3 and 4, which action forcibly moves the cams 50 out of the way. As the parts reach the fully closed position, however, the cams 50 are again enabled to swing to the operative positions shown in Fig. 4, all as described in the aforesaid patent.

Assuming it is desired to lock all of the doors from the outside, the spindle 102, associated with door 12, may be rocked in a counterclockwise direction, which action, as previously mentioned, moves the locking slide 128 into a position beneath and in blocking relation to the retracting slide 74, thereby rendering the outside handle 22, associated with door 12, ineffective. The same movement of the spindle 102 also drives the bar 108 to the left and completes the circuit through the switch contacts 174. This action, as previously mentioned and as is further described with reference to Fig. 18, completes circuits for energizing the locking electromagnets 154, associated with all of the other doors, which thereupon actuate their corresponding locking levers 132 and 132L. Upon being so actuated, the locking levers 132 and 132L take up positions in blocking relation to their associated rollbacks 72a, thereby rendering the corresponding outside handles ineffective. It will be noticed that the closure of such other doors may occur either before or after the corresponding locking levers 132 are actuated to the locked position without disturbing the locked condition thereof. The return movement of the lock spindle 102, in removing the key, does not alter the position of the locking slide 128, as previously mentioned, but it does restore the bar 108 to the retracted position, thereby opening the circuits for the electromagnets 154. The latter action is without effect on the locking levers 132 and 132L, however, because of the over-center action of the springs, such as 150 and 150L.

It is believed to be evident that an opposite or an unlocking movement of the lock spindle 102 restores the locking slide 128 to the unlocked position, thereby again rendering the outside handle 22 for the door 12 effective, and also moves the bar 112 so as to complete a circuit through the stationary contacts 176. This latter action energizes the unlocking electromagnets 156, associated with all the other doors, which thereupon restores the locking levers 132 and 132L to the unlocked positions, again rendering the outside handles for the corresponding doors effective.

As is described in connection with Fig. 17, and certain others of the later figures, means are provided for simultaneously energizing the inside locking electromagnets 194 for all of the doors. It will be appreciated from a previous description that upon being energized, the electromagnets 194 are enabled to swing the corresponding locking arms 180 into blocking relation to the housings 40, associated with the corresponding bolts, thereby preventing the corresponding doors from being opened. When the electromagnets 194 are de-energized, on the other hand, the springs 196, associated therewith, are enabled to return the locking arms 180 to the normal positions shown in Fig. 3, in which they do not interfere with the opening and closing movements of the associated doors. It will be noticed that any of the doors may be closed after the corresponding magnet 194 is energized, which closing movement enables the bolt housing 40 to swing the corresponding locking lever 180 against the pull of the magnet 194. As soon as the housing 40 passes the lever 180, the magnet 194 is enabled to move such lever 180 to the locked position.

Referring particularly to Figs. 7 through 10, a latch construction is shown, which in certain aspects is an improvement upon the construction and arrangement disclosed and claimed in applicant's copending application, Serial No. 187,370, filed January 28, 1938, now Patent No. 2,301,557, granted November 10, 1942. More particularly, the pillar 200, associated with the door 202, is provided with a mounting plate 204, which may be removably secured thereto as by the studs 206. The mounting plate 204 forms a support for a box-like housing 208, which encloses a vertically slidable bolt 210, one or more holding cams 212 and a combined retracting and safety catch member 214. The bolt 210 is provided with a generally flat body portion 216, to the lower end whereof a thickened head 218 is rigidly secured. The upper end of the bolt body is formed to provide an upwardly projecting tripping portion 220. The tripping portion 220 projects outwardly through an opening provided therefor in the left-hand side wall of the housing 208, as viewed in Figs. 8, 9 and 10, and the bolt head 218 is disposed to move through an opening provided therefor in the bottom wall of the housing 208. Suitable means may be provided within the housing, as will be understood, to guide the vertically reciprocating movements of the bolt 210 between the fully projected position of Fig. 8 and the retracted position of Fig. 10, and these guiding means are shown as comprising a pin 222, which passes through an elongated slot 224 formed in the body of the bolt 210. The pin 222 also serves as a mounting for the holding cam 212, only one such cam being shown. It will be understood, of course, that a plurality of cams 212 may be utilized corresponding to the previously described cams 50. The cam 212 is provided with a spring 226, which continuously urges it to the position shown in Fig. 8, in which the end thereof lies behind and in wedging relation to the bolt head 218, but may be swung to the retracted position shown in Figs. 9 and 10, in which the cam 212 enables upward movement of the bolt 210. When retracted, the bolt head 218 is effective to retain the cam 212 in its retracted position, as shown in Figs. 9 and 10.

The means for retracting the cam 212 comprises the previously mentioned member 214, the head whereof projects upward through an opening provided therefor in the top wall of the housing 208, and which is slidably guided by the housing for movement between the projected position of Fig. 8 and the retracted position of Fig. 10. A hairpin spring 228 is provided to normally urge the member 214 to the projected position of Fig. 8. The body of the member 214 is provided with a shoulder 230, which cooperates with a foot 232 formed on the cam 212 in such relation that when the member 214 is forced downwardly, the cam 212 is swung from the position of Fig. 8 to the position of Fig. 9.

The door 202 is provided with upper and lower abutments 240 and 242, respectively. The lower abutment 242 is provided with inclined camming and holding surfaces 244 and 246, respectively, and when the door is in the fully closed position, the inclined face of the bolt head 218 seats against the holding surface 246.

The upper abutment 240 is provided with a vertical face 248, which cooperates with the member 214 to hold the door in the partially closed position, as described below, and is also provided with an angled face 250, which cooperates with the tailpiece 220, as hereinafter described, to move the bolt downwardly far enough to release the cam 212 from the holding effect of the bolt head 218.

The upper abutment 240 is of chambered form and provides pivotal bearings for a rockable lever 252, the nose 254 whereof lies above the member 214 when the door is fully closed. The nose 256 of the lever 252 projects upwardly out of the abutment 240 for cooperation with a locking lever 258, which corresponds in function to the locking lever 132, described with reference to Figs. 1 through 6.

The door 202 also carries a pivoted lever 260, which may be rocked in a counterclockwise direction by operating the rollback 262 and a second lever 264, which may be rocked in a counterclockwise direction by operation of the lever 266. The rollback 262 is carried by the usual squared spindle 268, and levers 260 and 264 are carried upon a pin 270. The lever 266, in turn, is pivotally supported upon a pin 272 and is connected at one end to the usual link 274, which may, as will be understood, extend to the usual inside door handle, such as handle 26 of Fig. 1. As before, such inside handle may be provided with biasing spring means to normally retain it in a centered position in which the lever 266 occupies the position shown in Fig. 7, and similar return spring mechanism may be provided for lever 260. The levers 260 and 264 are provided with noses 276 and 278, respectively, which project through the door rail into the housing-like abutment 240 and lie beneath a rearwardly projecting shoulder 280, formed on the rockable lever 252. With this relation it will be understood that either the inside door handle or the outside door handle may be operated to rock the lever 252 in a clockwise direction, as viewed in Figs. 8, 9 and 10. This movement of the lever 252 enables the nose 254 thereof to bear upon the upper end of the safety catch and retracting member 214, and force the latter downwardly, thereby retracting the holding cam 212 and enabling an opening movement of the door, all as described in more detail below.

In the embodiment now being described, the locking lever 258 is pivotally carried upon a pin 282, the ends whereof are supported in a supplemental housing member 284, which is removably secured to the pillar 200. The member 284 also supports a locking magnet 288 and an unlocking magnet 286. The lever 258 is provided with an over-center spring 290, and it will be understood that if the magnet 286 is energized, the lever 258 is rocked from the unlocked position of Fig. 8 to a locked position in which the nose thereof lies in front of and in blocking relation to the lever 252, thereby preventing movement of such lever. If the unlocking magnet 286 is energized, lever 258 is swung back to the unlocked position and the spring 290 functions, of course, to yieldably retain such lever in either the locked or the unlocked position.

The construction thus far described may be and preferably is employed on all of the doors of the vehicle except one, such one remaining door being provided with key controlled locking mechanism and contact mechanism, as shown in Figs. 13 and 14. Referring to these figures, the construction and arrangement corresponds in all respects to that described with reference to Figs. 7 through 10, with the exception that the locking member 258 and its associated housing are not provided, and with the exception that instead, the key controlled mechanism, designated generally as 300, is provided. The key controlled mechanism comprises a vertically reciprocable locking slide 302, which is provided with an over-center spring 304, which releasably holds it in either the illustrated unlocked position or a lower locking position, in which the shoulder 306 thereon lies behind and in blocking relation to the upper end 308 of the rollback 262. The slide 302 is moved between the upper and lower positions by means of an operating cam 310, which rides in an opening 312 formed therein. The cam 310 is carried by a squared locking spindle 314, which may be and preferably is associated with a usual lock cylinder in the manner described in connection with the locking spindle 102 of Figs. 1 through 6. It will be understood that the cam 310 normally occupies the illustrated horizontal position. By inserting a key in the associated cylinder (not shown), the spindle 314 may be rocked in a counterclockwise direction through an angle of approximately 90° and then restored to the normal position, enabling withdrawal of the key. The just-mentioned movement of the cam 310 enables the end thereof to act against the lower surface of the opening 312 in the locking slide 302 and move the latter downwardly to the locking position. To unlock the door, the spindle may be rotated in an opposite direction through an angle of approximately 90° and then restored to the normal position. This rocking movement enables the cam 310 to act against the upper surface of the opening 312 and lift the locking slide 302 to the unlocked position.

The locking spindle 314 is also provided with a pinion 320, which meshes with a rack 322, which is suitably guided within the body of the door. The upper end of the rack 322 is coupled, by means of a pin 324 and a slot 326, to a bell crank lever 328, which lever is carried by a pin 330. The latter pin is passed through an elongated slot 332 in the locking slide 302 and thus assists in guiding the movements of the latter without at the same time interfering with such movements. The ends of the lever 328 are provided with, but insulated from, contact members 334 and 336, which cooperate with the stationary pairs of contacts 174 and 176 in the previously described manner. It will be understood that a locking movement of the spindle 314, in addition to moving the locking slide 302 into locking position, as aforesaid, also rocks the lever 328 in a counterclockwise direction, thereby projecting the contact 336 and completing a circuit through the stationary contacts 174. The return movement of the spindle restores the lever 328 to the normal position. Similarly, an unlocking movement of the spindle 314 projects the contact 334 and completes a circuit through the stationary contacts 176. The subsequent return movement of the spindle 314 also restores the lever 328 to the normal position.

As is described in more detail in connection with Fig. 18, the contacts 174 and 176 are associated with the locking and unlocking magnets 288 and 286, associated with all of the other doors, in the same manner that these contacts are associated with the locking and unlocking magnets 154 and 156 in the embodiment of Figs. 1 through 6.

Considering now the operation of the embodiment shown in Figs. 7 through 10, 13 and 14, the parts are shown with the doors 202 (Fig. 7) and 202R (Fig. 13) in the closed position and with the key controlled locking mechanisms in the unlocked condition. The doors 202 and 202R may thus be opened and closed in the usual manner by operation of either of the inside or the outside handles individual thereto. For example, if either the inside or the outside handle, associated with door 202, is operated, the lever 264 or 260, as the case may be, is rocked in a counterclockwise direction, which action, in turn, rocks the lever 252 in a clockwise direction, as viewed in Fig. 8. The latter action forces the member 214 downwardly against the force of the spring 228, and consequently rocks the holding cam 212 from the holding position of Fig. 8 to the retracted position of Figs. 9 and 10, in which latter position, the holding cam 212 is ineffective to prevent upward movement of the bolt 210. The opening tendency occasioned either by the pull on the operating handle or by the usual bumpers associated with the doors, applies an upward camming force to the bolt 210, and forces it upwardly from the holding position of Fig. 8 to a position in which the lower end thereof clears the keeper abutment 242. This upward movement of the bolt also brings the head thereof in front of and in holding relation to the cam 212, so that the latter is retained in the retracted position. Such opening movement of the door causes the abutments 240 and 242 to move to the right relative to the pillar 200, as viewed in Figs. 8, 9 and 10.

If the inside or outside handle, as the case may be, is retained in the operated position, the safety catch member 214 is retained in its retracted position in which it is below the upper abutment 240, thereby enabling the door to be fully opened. If the inside or outside handle is released before the safety catch member 214 passes the vertical righthand face of the upper abutment 240, the safety catch member 214 becomes effective to prevent further opening movement of the door. This is for the reason that such release of the inside or outside handle enables the spring 228, associated with the safety catch 214, to return the latter to the upper position of Fig. 8. The upward movement of the safety catch 214 brings the upper end thereof into the path of movement of the vertical face 248 of the upper abutment 240, thereby enabling these members to cooperate, as aforesaid, to prevent further opening movement of the door.

During a closing movement of the door, the abutments 240 and 242 move to the left, as viewed in Figs. 8, 9 and 10. At an early stage of this movement, the upper end of the safety catch 214 engages the tapered lefthand face 250 of the upper abutment 240, which engagement cams the lever 214 downwardly to the retracted position. Assuming that the bolt 210 is still retaining the cam 212 in its retracted position, this downward movement of the safety catch 214 is an idle movement. If for any reason the bolt 210 is moved downwardly to its projected position, while the door is open, such downward movement releases the cam 212 to the active position of Fig. 8. In such event, the just-mentioned movement of the safety catch 214 restores the holding cam 212 to the retracted position. During the time that the upper abutment 240 is still passing across the lever 214 and is effective to hold the latter in the retracted position, the angled face 244 of the lower abutment 242 reaches a position in vertical registry with the bolt head 218. If the bolt is in the retracted position of Fig. 9, under these circumstances, the face 244 does not engage the head of the bolt. If, however, as aforesaid, the bolt is moved to its lower position while the door is open, the face 244 becomes effective to cam the bolt 210 upwardly and enable the latter to again hold the cam 212 in the retracted position. Thus, although the safety catch 214 again resumes its upper position, as soon as the righthand face 248 of the upper abutment 240 passes to the left thereof, such return movement is without effect upon the position of the holding cam 212. Shortly after the high point of the lower abutment 242 passes to the left of the lower extremity of the bolt head 218, the lefthand angled face 250 of the upper abutment 240 engages the tail 220 on the bolt and is thereafter effective to cam the bolt 210 downwardly far enough to release the holding cam 212 from the holding effect of the bolt head 218. As soon as this action occurs, cam 212 becomes effective to swing in behind the bolt head 218 and positively prevents an upward or releasing movement thereof. The cam 212 also asserts a downward wedging force on the bolt head 218 so that final closing or take-up movements of the doors are immediately taken up by the cam 212.

Assuming it is desired to lock all of the vehicle doors, the key spindle 314 may be rotated, as previously described, thereby mechanically dogging the rollback 262, associated with the door 202R, by means of the locking slide 302, and also completing a circuit through the fixed contacts 174 to thereby energize the locking electromagnets 286, associated with all of the other doors. The latter action rocks the locking levers 258 into blocking relation to the levers 252, positively preventing retracting or door opening movements of the latter. An unlocking movement of the key spindle 314, on the other hand, restores the locking slide 302 to its unlocked position, thereby unlocking the door 202R and also momentarily energizing the unlocking magnets 288, associated with the other doors. The latter action restores the locking levers to their unlocked positions. If one of the doors, other than door 202R is closed after the associated locking lever 258 is swung to locking position, such closing movement enables the nose 256 to cam the locking lever 258 toward its unlocked position far enough to enable the nose 256 to pass. The required such movement, however, is not sufficient to cause spring 298 to pass over-center, and, therefore, as soon as nose 256 clears lever 258, the latter resumes the locking position.

The embodiment of Figs. 11 and 12 corresponds in all respects to the embodiment of Figs. 7 through 10, 13 and 14, with the exception that each of the doors is additionally provided with a locking electromagnet 194 corresponding in function and operation to the locking electromagnets 194 described with reference to Figs. 1 through 6. In this instance, each locking electromagnet 194 is provided with an armature 196, which is coupled by means of a pin 340 and a slot 342 to a locking bell crank 344. The nose of each bell crank 344 projects upwardly through an opening in a housing 346 provided therefor and carried by the pillar. In the locking position shown, the end 348 of each lever 344 is received in a notch provided in the underside of the previously described lower abutment 242. Upon de-energization of the magnet 194, a spring 350 associated with each locking lever 348 is enabled to swing the latter to a retracted position within the housing 346, in which it does not interfere with the opening and closing movements of the associated door.

A feature of the present invention resides in the provision of switching mechanism which automatically responds to an operating condition of the vehicle for controlling the locked or unlocked condition of the inside controlled coincidental locking elements. One such automatically operated switch mechanism is shown in Figs. 15, 16 and 17, and comprises a switch which occupies a normally open position, but which automatically assumes the closed position when the driver's seat of the vehicle is occupied. Referring more particularly to Figs. 15, 16 and 17, the reference characters 500 and 502 represent, respectively, the seat and back portions of a usual vehicle seat structure, and these members may be supported in any usual fashion in predetermined vertical spaced relation to the vehicle floor structure 504. In this instance, the underside of the seat portion 500 is provided with a pivoted member 506, which is secured to the seat frame 510 by means of a pin 508. The forward end of the lever 506 is provided with upper and lower forked portions 512 and 514, which receive between them a portion of the frame 510, so as to limit the amount of pivotal movement of the lever 506 relative to the seat. The front end of the lever 506 is also provided with an upwardly offset pad 516, and a compression spring 518 is seated between this pad and the front frame portion 510. The spring 518 is effective to normally maintain the lever 506 at its upper limit of movement.

The lever 506 forms the support for the lower ends of at least certain of the coil springs 519 with which the seat is provided, and it will be understood, therefore, that at least a portion of the weight of the occupant of the driver's portion of the seat 500 is transmitted through the springs 519 to the lever 506, which transmitted portion of the driver's weight is effective to force the lever 506 downwardly against the lifting force of the spring 518.

The switch designated as a whole as 520 is suitably secured to the floor structure 504 at a point below the lever 506. The switch 520 comprises a headed plunger 522, which projects downwardly through an insulated cover plate 524 and the lower end whereof is rigidly secured to a downwardly presenting cup-shaped spring retainer 526. The spring retainer 526 is vertically slidable within a cylindrical shell 528 to which the cover plate 524 is rigidly but removably secured, and a compression spring 530 is seated between the retainer 526 and the base of the housing 528.

Externally of the housing 528, the plunger 522 also carries a movable contact member 532. The contact member 532 has associated therewith, but insulated therefrom, a collar having an upwardly extending neck portion, the upper end whereof is inwardly flanged, as indicated at 534, and this flanged portion seats over a shoulder 536 formed on the plunger, thereby limiting downward movement of the contact 532 relative to the plunger. A compression spring 538, which is considerably lighter than the spring 530, is seated between the plunger head and movable contact 532.

The insulated cover 524 forms a support for a pair of fixed contacts 540 and 542, to which the conductors 544 and 546 are continuously electrically connected, and the fixed contacts 540 and 542 are disposed to be bridged by the movable contact 532 when the switch plunger is depressed, as hereinafter described.

As to operation, it will be appreciated that when a person is seated upon the seat portion 500, the weight transmitted through the springs 519 to the lever 506 rocks the latter in a clockwise direction against the forces of the springs 518 and 530 and depresses the same. The depressing movement of the plunger brings the movable contact 532 into bridging engagement with the fixed contacts 540 and 542 and completes an electrical circuit therethrough. The parts are preferably so proportioned that a weight of, for example, seventy-five pounds causes the plunger 522 to move downwardly far enough to not only bridge the contacts 540 and 542, but to also compress the light spring 538 to a substantial extent. With this relation, it will be understood that the limited springing movements which such person would experience during normal operation of the car, while being sufficient to permit some up and down movement of the plunger 522, may normally be expected to be less than the degree of compression of the spring 538. Consequently, during all normal operations of the vehicle, the spring 538 remains effective to maintain the contacts 540 and 542 in electrical connection with each other. In order to accommodate abnormal operating conditions, the structure may be and preferably is provided with dashpot mechanism which functions, upon release of the pressure on the plunger 522, to delay the upward movement of the plunger 522 for a predetermined period, such as one or two seconds. In the present case, such retarding mechanism is illustrated as comprising the relatively large openings 548 in the side walls of the housing 528 and the relatively restricted opening 550 in the base thereof. When the seat 500 is occupied, the side openings 548 are closed off by the cup-shaped retainer 526. During the initial downward movement of the plunger 522, however, such side openings permit a relatively rapid escape of air from the housing 528, so that the person occupying the seat does not experience an appreciable delay in the normal spring movement of the seat. During operation, however, the opening 550 affords the only intake and exhaust passage for the housing 528, and because of the restricted character of this opening, the consequent up and down movements of the plunger 522 are correspondingly retarded. When the driver's weight is entirely removed from the seat 500, the plunger 522 is enabled to rise at a limited rate until the side openings 528 are exposed, after which the final rate of movement of the plunger is enabled to occur without substantial retarding effect.

The control system of Fig. 18 illustrates preferred control circuits for use with the inside and outside locking structures of Figs. 1 through 6, and it will be observed that corresponding reference characters have been applied to the various elements in Fig. 18. Referring particularly to Fig. 18, it will be observed that the locking magnet 154 for the right rear door 10 and the locking magnet 154L for both the front and rear doors at the lefthand side of the car are connected in parallel with each other and in series with the usual vehicle battery and the fixed door controlled contacts 174. The unlocking magnet 156 for the right rear door 10 and the unlocking magnet 156L for the front and rear doors at the righthand side of the vehicle, in turn, are connected in parallel with each other and in series with the vehicle battery and the fixed door controlled contacts 176. If, therefore, the righthand front door 12 is closed, the key spindle 102 may be actuated to thereby move the locking slide 128 into dogging relation to the retracting slide 130, associated with the right front door, which action renders the corresponding outside handle ineffective. The movement of the key spindle also, as described above, projects the bar 108 to the left, causing it to bridge the fixed contacts 174, thereupon energizing the locking magnets 154 and 154L. Upon being energized, these magnets throw the corresponding locking arms 132 and 132L into the locked positions, thereby rendering the outside handles for the corresponding doors ineffective. The return movement of the key spindle 102 enables withdrawal of the key, but does not disturb the locked position of the locking slide 128. The return movement of the bar 108 interrupts the electrical connection between the contacts 174, and consequently de-energizes the locking magnets 154 and 154L. This action is without effect, however, by virtue of the over-center character of the springs 150 and 150L.

Accordingly, until such time as the key spindle 102 is rotated in an unlocking direction, the outside handles for all of the doors are ineffective, and it will be observed, as previously mentioned, that the locking action may take place when the right rear and lefthand doors are in either the open or closed position. If all or any of such doors are in the open position at the time the locking takes place, the same may thereafter be closed, after which they cannot again be opened from the outside until the system is unlocked.

As will be evident, an unlocking movement of the key spindle restores the locking slide 128 to the unlocked position, and actuates the bar 112 into bridging relation to the stationary contacts 176. The latter action energizes the unlocking magnets and restores the locking levers 132 and 132L to the unlocked position. The return movement of the spindle interrupts the circuit for the unlocking magnets, after which the locking levers 132 and 132L are maintained in the unlocked position by means of their associated springs.

As also shown in Fig. 18, the inside locking magnets 194, which are carried by the pillars at the right and lefthand sides of the vehicle, respectively, are connected in parallel with each other, and are further connected in series circuit relation with the previously described seat actuated switch 520 (Fig. 15), a normally closed push button 560 and the usual vehicle carried generator 562. The push button 560, as will be understood, may be arranged for manual operation from any convenient point within the vehicle, such as on the instrument panel, and may be and preferably is of toggle type, so that it will remain in either the open or the closed position.

With this arrangement, it will be understood that if a person of sufficient weight to actuate the seat switch 520 is seated in the driver's seat, and if, further, the push button 560 is closed and the vehicle engine is running, a circuit is completed for both of the magnets 194, which are thereupon rendered effective to rock the locking arms 180, associated with all of the doors, into the locking position. The magnet armatures may be and preferably are provided with movable contacts 564, which bridge corresponding stationary contacts 566 when the magnets are energized. All of the stationary contacts 566 are connected in series circuit relation with each other and with a suitable indicating element, such as a lamp 568, and it will be understood, therefore, that as soon as all of the locking electromagnets 194 move to the locked position, the lamp circuit is completed, thereby indicating to the occupants of the vehicle that the inside or safety control system is in locking condition.

It will be noticed that the generator 562 is electrically connected to the battery in the usual fashion, with a conventional cutout 570 interposed therebetween. The cutout 570, as will be understood, does not interfere with the delivery of charging current from the generator 562 to the battery, and to any circuits associated with the battery, but it does prevent the battery from forwarding current to the generator. Consequently, the circuits for the magnets 194 derive energy only from the generator and so come into effect only if the vehicle engine is running.

It will be understood from the previous description that if the manual push button 560 is open, or if the engine is stopped, or if the driver relieves the actuating weight from the seat switch 520 and allows the latter to open, the circuits for the magnets 194 and the indicating lamp 568 are interrupted. The interruption of these circuits enables the springs associated with the magnet armatures to restore the locking arms 180 to the unlocked position in which they are ineffective to interfere with opening and closing movements of the doors.

The system of Fig. 19 incorporates the inside and outside locking and unlocking structures described with reference to Figs. 7 through 14, and corresponding reference characters are applied to the corresponding elements. It is believed that the operation of the locking and unlocking elements which respond to locking and unlocking movements of the key spindle 214 is clear from the previous description of Figs. 7 through 14, and of Fig. 18.

The system of Fig. 19 also incorporates a manually controlled push button 560 in the generator circuit and further employs a normally open switch 572 in such circuit. It is believed to be evident that the switch 572 may be of the seat actuated type described in connection with Figs. 15, 16 and 17, in which event the remaining details of operation of the system of Fig. 19 correspond to those of Fig. 18. Alternatively, the normally open switch 572 of Fig. 19 may take the form shown in Figs. 20 and 21, in which a pair of fixed contacts 574 are carried upon an insulating support 576. The contacts 574 are adapted to be bridged by a movable contact 578, which is carried by a bar 580. The bar 580, in turn, is disposed to be moved between the circuit closing and opening positions by a manual operation which normally occurs as an incident to the operation of the vehicle. In this instance, the bar 580 is carried by the usual parking brake lever 582, and the arrangement is such that when the parking brake is applied, the contact 578 is moved out of cooperative relation to the fixed contacts 574. When the parking brake is released, the brake arm 582 and the bar 580 move to the right, as viewed in Figs. 20 and 21, and this movement causes the movable contact 578 to pass between and bridge the fixed contacts 574, thereby preparing the circuit for the safety or inside locking magnets 194, which circuit is completed, as will be understood, if the engine is also running and provided the manually controlled push button 560 is closed.

It will be appreciated from the foregoing description that the present invention provides efficient inside and outside locking control systems whereby the locked or unlocked condition of vehicle doors may be coincidentally controlled. The present invention further provides improved latch structure which in the broader aspects of the invention may be utilized in connection with either coincidental locking systems or with individual door latch systems, and further provides certain improvements in switch structures which have particular utility when employed in connection with locking systems of the present type. It will further be understood that various modifications in the form, number and arrangement of the parts may be made without departing from the spirit and scope of the invention, and that it is desired to introduce into the appended claims only such limitations as are properly imposed by the prior art.

What is claimed is:

1. In a latching and locking system for a vehicle having a plurality of doors and associated pillar structure, the combination of latch means individual to each door for cooperating between such door and said pillar structure to releasably hold such door in closed position, releasing means for each latch means, key operated mechanism carried by one of the doors, locking means mechanically moved by movement of said key operated mechanism for rendering the releasing means for the corresponding door ineffective, additional locking means comprising electromagnetic elements carried by said pillar structure and operably responsive to said movement of said key operated mechanism for rendering the releasing means for each other door ineffective, said additional locking means including means which, when actuated to locking condition, while rendering said releasing means ineffective as aforesaid, do not interfere with movement of a said other door from the open position to the closed position.

2. In a latching and locking system for a vehicle, having a plurality of doors and associated pillar structure, the combination of latch means individual to each door for cooperating between such door and said pillar structure to releasably hold such door in closed position, releasing means for each latch means, key operated mechanism carried by one of the doors, locking means operably responsive to actuation of said key operated mechanism for rendering the releasing means for the corresponding door ineffective, and additional locking means comprising electromagnetic elements carried by said pillar structure and operably responsive to said actuation of said key operated mechanism for rendering the releasing means for the other doors ineffective, the effectiveness of said additional locking means being controlled in accordance with the position of said one of said doors.

3. In a latching and locking system for a vehicle having a plurality of doors and associated pillar structure, the combination of latch means individual to each door for cooperating between such door and said pillar structure to releasably hold such door in closed position, releasing means for each latch means, key operated mechanism carried by one of the doors, locking means operably responsive to actuation of said key operated mechanism for rendering the releasing means for the corresponding door ineffective, and additional locking means comprising electro magnetic elements carried by said pillar structure and operably responsive to said actuation of said key operated mechanism for rendering the releasing means for the other doors ineffective, the releasing means for said other doors including portions which project outwardly from the corresponding door when operated, and said additional locking means including means movable into blocking relation to said portions.

4. In a latching and locking system for a vehicle having a plurality of doors, the combination of latch means individual to each of said doors, releasing means individual to each latch means, a key operable mechanism carried by one of said doors, a locking member operably responsive to actuation of said key operable mechanism and directly movable into blocking relation to the releasing means for the corresponding door, and means comprising switch means actuable by said actuation of said key operable mechanism simultaneously with said locking member for rendering the releasing means for the other doors ineffective, said switch means including means carried in part on said one door and in part on a cooperatively relatively stationary part of said vehicle.

5. In a latching and locking system for a vehicle having a plurality of doors, a latch individual to each door for cooperating between it and a relatively stationary part of the body to hold the corresponding door in closed position, manually operable means individual to each door for releasing the corresponding latch, said manually operable means for all but one of said doors including an element which when operated projects outwardly from the corresponding door, a key operable mechanism on said one door, means movable by actuation of said key operable mechanism for rendering the manually operable means for the corresponding door ineffective, stationary switch means carried on said body part, movable switch means carried by said one door and projectable by said actuation of key operable mechanism into contact with said stationary switch means, and means comprising electro magnetic means carried by said body part and operably responsive to said actuation of said key operable mechanism for blocking movement of said elements for each other door.

6. In a latch for a vehicle having a door member and a cooperating pillar member, the combination of a bolt movably carried by one of said members, holding means associated with the bolt, releasing means for said holding means carried by said one member, manually operable means carried by the other said member, said manually operable means including means effective when the door is in closed position to engage and operate said releasing means.

7. In a latch for a vehicle having a door member and a cooperating pillar member, the combination of a bolt movably carried by one member for cooperation with a keeper carried by the other member, holding means engageable with the bolt to prevent release therefrom, a releasing element carried by said one member and operable to release said holding means, said releasing member also being cooperable with keeper means carried by the other member to hold the door in a partially closed position, and manually operable means carried by the other member and including an element engageable with said releasing member when the door is closed.

ROLLO MARPLE.

REFERENCES CITED

The following references are of record in the file of this patent:

UNITED STATES PATENTS

| Number | Name | Date |
| --- | --- | --- |
| 199,255 | Bowe | Jan. 15, 1878 |
| 1,229,473 | Keenan | June 12, 1917 |
| 1,242,750 | Wells | Oct. 9, 1917 |
| 1,361,317 | Dulczewski, et al. | Dec. 7, 1920 |
| 1,477,771 | Rowntree | Dec. 18, 1923 |
| 1,496,699 | Wooden | June 3, 1924 |
| 1,675,465 | Roehrich | July 3, 1928 |
| 1,873,560 | Ekman | Aug. 23, 1932 |
| 1,901,541 | Ulrich | Mar. 14, 1933 |
| 1,956,978 | Nafziger | May 1, 1934 |
| 2,031,344 | Thomasma | Feb. 18, 1936 |
| 2,130,559 | Papp | Sept. 20, 1938 |
| 2,153,088 | Knell | Apr. 4, 1939 |
| 2,160,011 | Beck | May 30, 1939 |
| 2,189,748 | Wilson | Feb. 6, 1940 |
| 2,199,471 | Vacca | May 7, 1940 |
| 2,204,208 | Craig | June 11, 1940 |
| 2,212,251 | Seelinger | Aug. 20, 1940 |
| 2,219,132 | Hohmann, et al. | Oct. 22, 1940 |
| 2,243,282 | Marple | May 27, 1941 |
| 2,250,014 | Fitz Gerald | July 22, 1941 |
| 2,254,419 | Castle | Sept. 2, 1941 |
| 2,259,670 | Van Voorhees | Oct. 21, 1941 |
| 2,301,557 | Marple | Nov. 10, 1942 |
| 2,314,815 | Brandt | Mar. 23, 1943 |